United States Patent
May et al.

(10) Patent No.: US 11,220,625 B2
(45) Date of Patent: Jan. 11, 2022

(54) SETTABLE, REMOVABLE, AND REUSABLE LOST CIRCULATION FLUIDS

(71) Applicant: Halliburton Energy Services, Inc., Houston, TX (US)

(72) Inventors: Preston Andrew May, Porter, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/588,476

(22) Filed: Sep. 30, 2019

(65) Prior Publication Data

US 2021/0095189 A1 Apr. 1, 2021

(51) Int. Cl.
*C09K 8/76* (2006.01)
*E21B 21/06* (2006.01)
*E21B 33/12* (2006.01)
*E21B 33/13* (2006.01)

(52) U.S. Cl.
CPC .............. *C09K 8/76* (2013.01); *E21B 21/062* (2013.01); *E21B 21/063* (2013.01); *E21B 33/12* (2013.01); *E21B 33/13* (2013.01)

(58) Field of Classification Search
None
See application file for complete search history.

(56) References Cited

U.S. PATENT DOCUMENTS

| | | |
|---|---|---|
| 6,444,316 B1 | 9/2002 | Reddy |
| 6,767,868 B2 | 7/2004 | Dawson et al. |
| 8,540,025 B2 | 9/2013 | Reddy et al. |
| 8,636,069 B2 | 1/2014 | Reddy et al. |
| 8,809,521 B2 | 8/2014 | Melvik et al. |
| 9,587,469 B2 | 3/2017 | Miller |
| 2008/0190609 A1 | 8/2008 | Robb |
| 2012/0024777 A1 | 2/2012 | Sugita et al. |
| 2012/0145387 A1 | 6/2012 | Pyatina et al. |
| 2012/0247774 A1 | 10/2012 | Li |
| 2015/0000912 A1 | 1/2015 | Choudhary |
| 2016/0032176 A1 | 2/2016 | Jiang et al. |
| 2016/0264842 A1 | 9/2016 | Miller |
| 2016/0272871 A1* | 9/2016 | Belakshe ............... C09K 8/032 |
| 2016/0280990 A1* | 9/2016 | Lieng ...................... E21B 43/26 |
| 2019/0031941 A1 | 1/2019 | Chatterji |

FOREIGN PATENT DOCUMENTS

EP 2360223 A1 8/2011

* cited by examiner

*Primary Examiner* — Jeffrey D Washville
(74) *Attorney, Agent, or Firm* — Chamberlain Hrdlicka

(57) ABSTRACT

A method of drilling may include mixing, at the surface, a base fluid, a polyvalent cation reactive polymer, and a delayed source of polyvalent cation so as to form a treatment fluid; placing the treatment fluid in a subterranean formation to form a solid plug including the polyvalent cation reactive polymer crosslinked with the polyvalent cation; contacting the solid plug with a breaker so as to transform the solid plug into a reclaimed treatment fluid; and removing the reclaimed treatment fluid. A system for drilling may include a treatment fluid, at the surface, including a polyvalent cation reactive polymer, and a delayed source of a polyvalent cation, where the treatment fluid is settable in the formation to form a solid plug including the polyvalent cation reactive polymer and the polyvalent cation; and a breaker, separate from the treatment fluid at the surface, capable of liquefying the solid plug.

18 Claims, 6 Drawing Sheets

```
                                    ┌─ 210
                                    ↓
220 ─┐
  ┌──────────────────────────────────────────────────────────────┐
  │  INTRODUCING A TREATMENT FLUID INCLUDING A BASE FLUID, A     │
  │ POLYVALENT CATION REACTIVE POLYMER, A SOURCE OF A POLYVALENT │
  │   CATION, AND AN ACID PRECURSOR INTO A WELLBORE PENETRATING  │
  │       AT LEAST A PORTION OF A SUBTERRANEAN FORMATION         │
  └──────────────────────────────────────────────────────────────┘
                                 │
230 ─┐                           ↓
  ┌──────────────────────────────────────────────────────────────┐
  │     ALLOWING THE ACID PRECURSOR TO AT LEAST PARTIALLY DEGRADE │
  └──────────────────────────────────────────────────────────────┘
                                 │
240 ─┐                           ↓
  ┌──────────────────────────────────────────────────────────────┐
  │      DEGRADATION OF THE ACID PRECURSOR RELEASES ONE OR MORE  │
  │                              ACIDS                           │
  └──────────────────────────────────────────────────────────────┘
                                 │
250 ─┐                           ↓
  ┌──────────────────────────────────────────────────────────────┐
  │ ALLOWING THE ONE OR MORE ACIDS TO AT LEAST PARTIALLY DEGRADE │
  │     OR DISSOLVE THE SOURCE OF THE POLYVALENT CATION          │
  └──────────────────────────────────────────────────────────────┘
                                 │
260 ─┐                           ↓
  ┌──────────────────────────────────────────────────────────────┐
  │ DEGRADATION OR DISSOLUTION OF THE SOURCE OF THE POLYVALENT   │
  │       CATION RELEASES ONE OR MORE POLYVALENT CATIONS         │
  └──────────────────────────────────────────────────────────────┘
                                 │
270 ─┐                           ↓
  ┌──────────────────────────────────────────────────────────────┐
  │ ALLOWING THE ONE OR MORE POLYVALENT CATIONS TO CROSSLINK     │
  │         THE POLYVALENT CATION REACTIVE POLYMER               │
  └──────────────────────────────────────────────────────────────┘
                                 │
280 ─┐                           ↓
  ┌──────────────────────────────────────────────────────────────┐
  │     ALLOWING THE TREATMENT FLUID TO AT LEAST PARTIALLY SET   │
  └──────────────────────────────────────────────────────────────┘
```

*FIG. 2*

SETTABLE, REMOVABLE, AND REUSABLE LOST CIRCULATION FLUIDS

BACKGROUND

The present disclosure relates to lost circulation compositions and systems and methods for using the same in subterranean formations.

Operations to explore for and/or extract a subterranean product from the earth through a well often use treatment fluids to facilitate or implement the operations. Hydrocarbons, such as oil and gas, are subterranean products commonly extracted from reservoirs, areas of the earth that contain the hydrocarbons. A reservoir may be deep below the surface of the earth and the earth may include one or more formations that are above and/or make up the reservoir. A formation is a region of the earth with a distinct lithology describing the physical characteristics of the rock in the formation, such as mineral content.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Illustrative operations may include, for example, drilling, completion, stimulation, and production. Stimulation operations may include, for example, fracturing and acidizing. In drilling, a drill bit is used to drill a borehole into the earth. A drilling fluid may be used with the drill bit to advance the borehole beneath the surface of the earth. For example, a drilling fluid, or "mud", may be circulated in the borehole with the drill bit to facilitate the drilling operation. As the drilling progresses the drilling fluid is circulated in the wellbore.

Treatment fluids used in servicing a wellbore may be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Treatment techniques may be employed to address fluid loss that occurs during drilling or other downhole operations such as plugging or bridging loss zones. Lost circulation treatment involving settable lost circulation fluids have been used to prevent or lessen the loss of fluids from wellbores. Most current techniques for using settable lost circulation materials involve materials that react quickly and therefore must be delivered downhole separately in a binary, dual-stream manner. Further, most current techniques for using settable circulation materials involve materials that are not readily recycled.

BRIEF DESCRIPTION OF THE DRAWINGS

These drawings illustrate certain aspects of some of the embodiments of the present disclosure and should not be used to limit or define the claims.

FIG. 2 is a process flow for placing a treatment fluid including a polyvalent cation reactive polymer, a source of a polyvalent cation, and an acid precursor in a subterranean formation in accordance with certain embodiments of the present disclosure.

Figure 1:
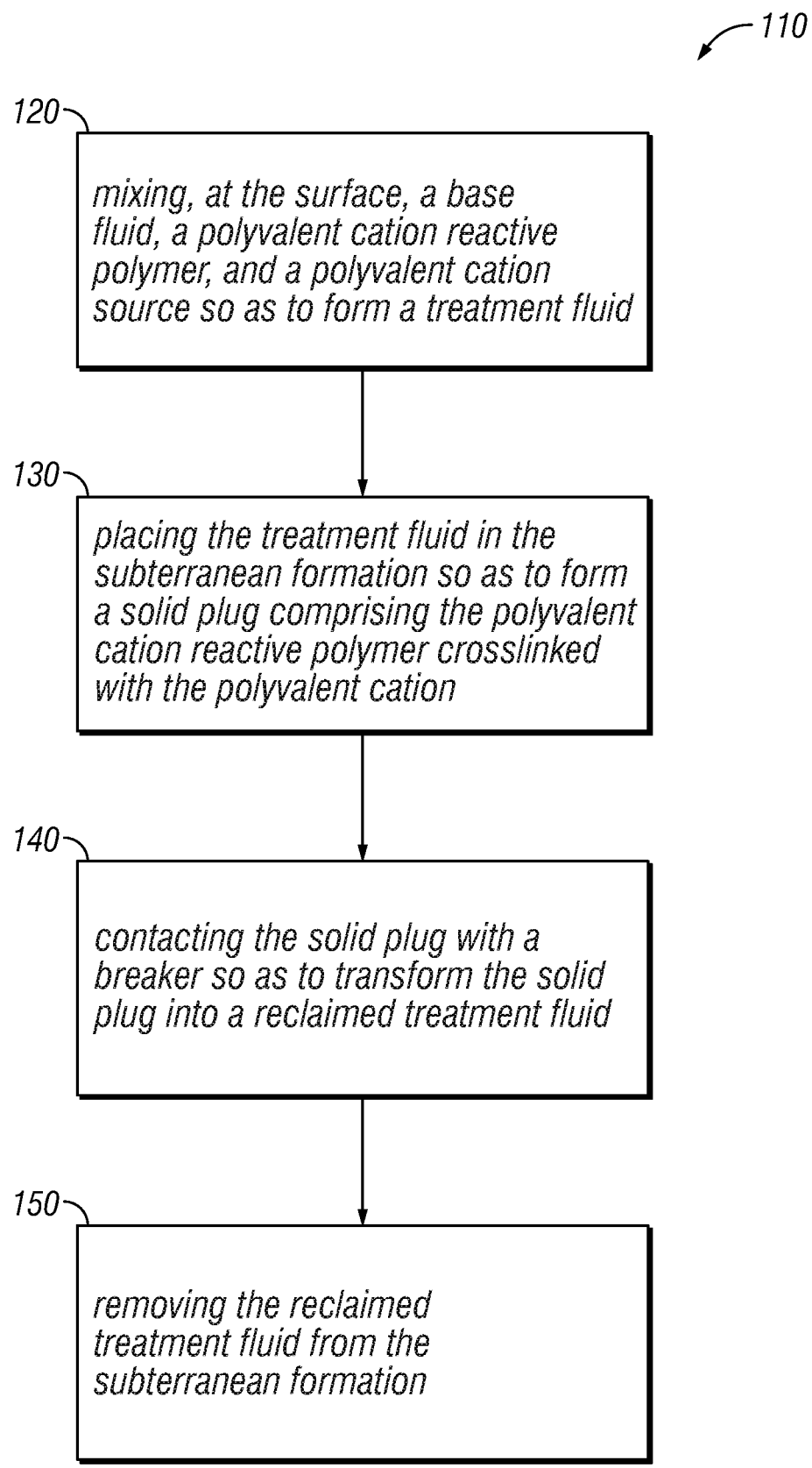
FIG. 1 is a process flow for drilling a borehole in a subterranean formation in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of a liquid material transitioning to a harder or more solid material by curing. For example, in certain embodiments, a fluid may be considered "set" when the shear storage modulus is greater than the shear loss modulus of the fluid. In certain embodiments, a fluid may be considered "set" or at least partially set when it forms a gel.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Unless otherwise indicated, a numerical parameter "n" expressing quantities used in the present disclosure and associated claims means "about n". Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

Every range of values (e.g., "from a to b") disclosed herein is to be understood as referring to the power set (the set of all subsets) of the respective range of values.

Reference throughout this specification to "include" means include, but is not limited to. Likewise, reference through this specification to "includes" means includes, but is not limited to.

Reference throughout this specification to "one embodiment," "an embodiment," "an embodiment," "embodiments," "certain embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The present disclosure provides lost circulation systems and methods for using the same in subterranean formations. More specifically, the present disclosure provides recyclable lost circulation compositions and methods for using the compositions that include placing treatment fluids containing the lost circulation compositions in the subterranean formation where the compositions set under subterranean conditions and are re-fluidized by a compatible breaker, allowing the lost circulation compositions to perform, be removed and recycled.

The lost circulation systems include the treatment fluid and the breaker. The breaker is separate from the treatment fluid when at the surface. The treatment fluid includes a base fluid, a delayed source of a polyvalent cation, a polyvalent cation reactive polymer, and a delaying agent for delaying formation of the polyvalent cation from the source. The delaying agent may be an acid precursor from which the acid forms, triggered by the heat delivered by the temperature of the subterranean formation. The acid may in turn trigger forming the polyvalent cation from the source. Alternatively, the delaying agent may be a degradable coating encapsulating the delayed source of the polyvalent cation, which degrades under the conditions of the subterranean formation. The breaker may be a chelator. The composition may set through cross-linking of the polyvalent reactive polymer by the polyvalent cation. The composition may re-fluidize through a greater affinity of the chelator than the polyvalent reaction polymer to the polyvalent cation, stripping the polyvalent cation from the polyvalent cation reactive polymer.

Among the numerous advantages of the present disclosure, the methods and systems of the present disclosure provide a treatment fluid that includes a lost circulation composition that is able to be mixed at the surface and pumped downhole as a single stream through a drill pipe or other conduit, rather than pumping in separate streams of components that react to form a lost circulation material. In certain embodiments, mixing at the surface simplifies pumping the composition downhole and avoids issues related to separate streams mixing sufficiently and in the correct location in the subterranean formation. Also, as compared to lost circulation compositions mixed downhole, the lost circulation composition of the present disclosure, mixed at the surface to be a single stream, is more intimately, that is thoroughly, mixed. Therefore the lost circulation composition sets to create a more homogeneous solid that conforms more closely to the shape of the area to be plugged in the subterranean formation. In certain embodiments, the treatment fluids of the present disclosure may be substantially free of larger particles, which may allow the composition to be pumped through a drill bit. In certain embodiments, the treatment fluids of the present disclosure are pill fluids. In certain embodiments, the treatment fluids of the present disclosure are suitable for mitigating or preventing severe to total lost circulation, even in circumstances where particulate solutions have (or would have) failed. In certain embodiments, the treatment fluids of the present disclosure may be used in combination with other lost circulation materials, among other reasons, to improve their effectiveness. In certain embodiments, the treatment fluids of the present disclosure have tunable properties, including set time, set strength, density, viscosity, etc. For example, the treatment fluids of the present disclosure may be tuned to provide a slower setting time, which may facilitate more effective placement of the lost circulation material in a loss zone. Further, the treatment fluids of the present disclosure may be tuned of the temperature of the subterranean formation. For example, when an acid precursor is used, the acid precursor may be selected for the temperature. One skilled in the art will recognize that different acid precursors may release acid at different temperatures and rates.

The breaker is a compound that has an affinity for the polyvalent cation to form a complex with the polyvalent cation. The breaker may have a greater, that is stronger, affinity for the polyvalent cation than the polyvalent cation reactive polymer. The breaker may react more strongly with the polyvalent cation than the polyvalent cation reactive polymer reacts with the polyvalent cation. The breaker may be a chelator. A chelator is a compound that has multiple groups capable of complexing with ligand. The chelator may be a chelator for the polyvalent cation, that is capable of complexing with the polyvalent cation.

Examples of chelators suitable for certain embodiments include citrate, N,N-dicarboxymethyl glutamic acid tretrasodium salt (GLDA), ethylenediaminetetraacetic acid (EDTA), diethylenetriaminepentaacetic acid (DTPA), nitrilotriacetic acid (NTA), trans-1,2-cyclohexanediamine-n,n,n',n'-tetraacetic acid (CyDTA), ethylene glycol-bis(β-aminoethyl ether)-N,N,N',N'-tetraacetic acid (EGTA), Triethylenetetramine-N,N,N',N'',N''',N''''-hexaacetic acid (TTHA), iminodiacetic acid (IDA), 1,2-bis(o-aminophenoxy)ethane-N,N,N',N'-tetraacetic acid (BAPTA), and combinations thereof.

The polyvalent cation reactive polymer of the treatment fluids of the present disclosure is a polymer that chemically reacts in the presence of polyvalent cation. In certain embodiments, the reaction of the polyvalent cation reactive polymer and the polyvalent cation may result in an increase in the viscosity of the treatment fluid. For example, introduction of the polyvalent cation reactive polymer to one or more polyvalent cations may result in crosslinking of the polymer. Crosslinking of the polymer may cause the polymer and/or the treatment fluid to at least partially set (e.g., form a gel). Examples of polyvalent cation reactive polymers suitable for certain embodiments of the present disclosure include carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate, any derivative of the foregoing, and any combination thereof. In certain embodiments, the polyvalent cation reactive polymer is a carboxylate or sulfonate containing polymer. In certain embodiments, the polyvalent cation reactive polymer has a molecular weight (MW) of from about 2,000 Daltons to about 10,000,000 Daltons, from about 5,000 Daltons to about 1,000,000 Daltons, or from about 7,500 Daltons to about 500,000 Daltons.

In certain embodiments, the polyvalent cation reactive polymer may be present in a treatment fluid in an amount within a range of from about 0.01% to about 40% by weight of the treatment fluid (e.g., up to about 5%, about 10%, about 15%, about 20%, about 25%, about 30%, about 35%, or about 40%, all by weight of the treatment fluid). In certain embodiments, the polyvalent cation reactive polymer may be present in an amount within a range of from about 0.01% to about 30% by weight of the treatment fluid, from about 1% to about 20% by weight of the treatment fluid, or from about 0.01 to about 10% by weight of the treatment fluid. In one or more embodiments, the polyvalent cation reactive polymer may be present in a treatment fluid in an amount within a range of about 1% to about 10% by weight of the treatment fluid.

As used herein, a "polyvalent cation" refers to a cation that exhibits more than one valence. As used herein, a source of a polyvalent cation generally refers to a component, which itself is not a polyvalent cation, but which, under certain conditions, will yield one or more polyvalent cations.

For example, in certain embodiments, the source of the polyvalent cation may at least partially degrade or dissolve and the degradation or dissolution will release one or more polyvalent cations. In certain embodiments, the source of the polyvalent cation may degrade or dissolve in response to one or more wellbore conditions. For example, in certain embodiments, the source of the polyvalent cation may at least partially degrade or dissolve in response to thermal energy (e.g. the bottom hole temperature). In certain embodiments, the source of the polyvalent cation may at least partially degrade or dissolve and release one or more polyvalent cations in response to a decrease in pH or in response to exposure to an acid (e.g., exposure to an acid generated by an acid precursor). In certain embodiments, the source of the polyvalent cation may release the polyvalent cation without interacting with or contacting a wellbore surface (e.g., without reacting or interacting with a calcium carbonate surface).

In certain embodiments, the source of a polyvalent cation may be a source of a divalent, trivalent, tetravalent, or pentavalent cation, or any combination thereof. In certain embodiments, the polyvalent cation may be a divalent, trivalent, tetravalent, or pentavalent cation, or any combination thereof. The polyvalent cation may be a metal cation. With reference to the new IUPAC Periodic Table, examples of polyvalent cations suitable for certain embodiments of the present disclosure include alkaline earth metal cations, rare earth metal cations, transition metal cations, Group 13 metal cations, Group 14 metal cations, Group 15 metal cations, lanthanide metal cations, and any combination thereof. Examples of alkaline earth metal cations suitable for certain embodiments of the present disclosure include $Mg^{2+}$, $Ca^{2+}$, $Sr^{2+}$, $Ba^{2+}$, and any combinations thereof. Examples of rare earth metal cations suitable for certain embodiments of the present disclosure include $Sc^{3+}$, $Y^{3+}$, and any combinations thereof. Examples of transition metal cations suitable for certain embodiments of the present disclosure include $Ti^{4+}$, $Ti^{3+}$, $Zr^{4+}$, $Zr^{3+}$, $Zr^{2+}$ $Hf^{4+}$, $V^{5+}$, $V^{4+}$, $V^{3+}$, $V^{2+}$, $Nb^{3+}$, $Ta^{3+}$, $Cr^{3+}$, $Mo^{3}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{3+}$, $Ir^{2+}$, $Ni^{2+}$, $Pd^{4+}$, $Pd^{2+}$, $Pt^{2+}$, $Cu^{2+}$, $Zn^{2+}$, $Cd^{2+}$, $Hg^{2+}$, and any combinations thereof. Examples of Group 13 metal cations suitable for certain embodiments of the present disclosure include $Al^{3+}$, $Ga^{3+}$, $In^{3+}$, $Tl^{3+}$, and any combination thereof, and any combinations thereof. Examples of Group 14 metal cations suitable for certain embodiments of the present disclosure include $Si^{4+}$, $Si^{2+}$, $Ge^{4+}$, $Ge^{2+}$, $Sn^{4+}$, $Sn^{2+}$, $Pb^{4+}$, and any combination thereof, and any combinations thereof. Examples of Group 15 metal cations suitable for certain embodiments of the present disclosure include $As^{3+}$, $As^{3+}$, $Sb^{3+}$, $Sb^{3+}$, $Bi^{3+}$, $Bi^{3+}$, and any combination thereof, and any combinations thereof. It will be understand that any one of the Group 13, Group 14, and Group 15 metals may include semi-metals. Examples of lanthanide metal cations suitable for certain embodiments of the present disclosure include $La^{3+}$, $Ce^{3+}$, $Ce^{4+}$, $Gd^{3+}$, $Eu^{3+}$, $Tb^{3+}$, and any combination thereof, and any combinations thereof. Thus, examples of polyvalent cations suitable for certain embodiments of the present disclosure include $Mg^{2+}$, $Ca^{2+}$, $Sr^{2+}$, $Ba^{2+}$, $Sc^{3+}$, $Y^{3+}$, $Ti^{4+}$, $Ti^{3+}$, $Zr^{4+}$, $Zr^{3+}$, $Zr^{2+}$, $Hf^{4+}$, $V^{5+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{3+}$, $Ir^{2+}$, $Ni^{2+}$, $Pd^{4+}$, $Pd^{2+}$, $Pt^{2+}$, $Cu^{2+}$, $Zn^{2+}$, $Cd^{2+}$, $Hg^{2+}$, $Al^{3+}$, $Ga^{3+}$, $In^{3+}$, if, $Si^{4+}$, $Si^{2+}$, $Ge^{4+}$, $Ge^{2+}$, $Sn^{4+}$, $Sn^{2+}$, $Pb^{4+}$, $As^{5+}$, $As^{3+}$, $Sb^{5+}$, $Sb^{3+}$, $Bi^{5+}$, $Bi^{3+}$, $La^{3+}$, $Ce^{3+}$, $Ce^{4+}$, $Gd^{3+}$, $Eu^{3+}$, $Tb^{3+}$, and any combination thereof. In certain embodiments, exemplary suitable polyvalent cations include calcium and magnesium. In certain embodiments, calcium is capable to react with alginate, carrageenan, and/or pectin. In certain embodiments, magnesium is capable to react with alginate, carrageenan, and/or pectin.

In certain embodiments, the source of the polyvalent cation may be a salt of the polyvalent cation. Examples of salts suitable for certain embodiments of the present disclosure include carbonates, oxides, sulfate-hydrates, sulfates, hydroxides, and any combinations thereof. Further examples of salts suitable for certain embodiments of the present disclosure include nitrates, phosphates, fluorides, chlorides, bromides, iodides, acetates, formates, and any combination thereof. Thus, examples of polyvalent cation salts suitable for certain embodiments of the present disclosure include calcium carbonate, calcium sulfate-hydrate, magnesium carbonate, calcium oxide, magnesium oxide, calcium hydroxide, magnesium hydroxide, and any combination thereof. Further, examples of polyvalent cation salts suitable for certain embodiments of the present disclosure include calcium nitrate, calcium phosphate, calcium fluoride, calcium chloride, calcium bromide, calcium iodide, calcium acetate, calcium formate, magnesium nitrate, magnesium phosphate, magnesium fluoride, magnesium chloride, magnesium bromide, magnesium iodide, magnesium acetate, magnesium formate, and combinations thereof. In certain embodiments, the source of the polyvalent cation may include one or more substantially water-insoluble salts. It will be understood that for the purposes of the present disclosure, a substantially water-insoluble salt is water-insoluble until it is released, for example by reaction with acid. Thus, the water-insoluble salt is a delayed source of polyvalent cation. In certain embodiments, the source of the polyvalent cation may include one or more water-soluble salts. It will be understood that the water-soluble salt may be encapsulated, such as by a degradable coating. Thus, the encapsulated water-soluble salt is a delayed source of polyvalent cation. In one or more embodiments, the source of the polyvalent cation may include particles sized within a range of from about 1 to about 2,000 microns (e.g., particles with a diameter from about 1 to about 2,000 microns). In certain embodiments, the lost circulation material includes particles sized 1,000 microns in diameter or smaller. In certain embodiments, the lost circulation material includes particles sized 500 microns in diameter or smaller. For example, in certain embodiments, the polyvalent cation may have a d50 particle size distribution of from about 5 to about 1,200 microns. In certain embodiments, the lost circulation material may exhibit a d50 particle size distribution of 1,200 microns or less, 600 microns or less, 400 microns or less, 150 microns or less, 50 microns or less, 25 microns or less, or 5 microns or less. In certain embodiments, the source of the polyvalent cation may include BARACARB® particulates (ground marble, available from Halliburton Energy Services, Inc.) including BARACARB® 2, BARACARB® 5, BARACARB® 25, BARACARB® 50, BARACARB® 150, BARACARB®400, BARACARB® 600, BARACARB® 1200, or any combination thereof.

In certain embodiments, the source of the polyvalent cation may be a synthetic or natural mineral fiber. Mineral fibers suitable for certain embodiments of the present disclosure include acid-soluble mineral fibers, such as the fiber commercially available from Halliburton Energy Services, Inc., of Houston, Tex. under the trade name N-SEAL™. In certain embodiments, examples of mineral fibers suitable for certain embodiments of the present may include glass fibers, glass wool, slag wool, stone wool, rock wool, silicate fiber, silicate cotton, ceramic fiber wool, and any combination thereof. In certain embodiments, the source of the polyvalent cation may include fibers with a diameter of from about 0.1 to about 50 microns, from about 1 micron to about 20 microns, or from about 5 to about 15 microns. In certain embodiments, the source of the polyvalent cations may include fibers with a length of from about 0.1 to about 50,000 microns, from about 1 micron to about 25,000 microns, or from about 100 to about 10,000 microns.

In certain embodiments, the treatment fluids of the present disclosure may not include a significant amount of particles sized greater than 1000 microns in diameter, or may not include any particles that size. For example, in certain embodiments, particles sized greater than 1000 microns in diameter may be present in the treatment fluid in an amount less than 0.5% by weight of the treatment fluid, less than 0.4% by weight of the treatment fluid, less than 0.3% by weight of the treatment fluid, less than 0.2% by weight of the treatment fluid, less than 0.1% by weight of the treatment fluid, or less than 0.01% by weight of the treatment fluid. In certain embodiments, the treatment fluids of the present disclosure may not include a significant amount of particles sized greater than 100 microns diameter, or may not include any particles that size. For example, in certain embodiments, particles sized greater than 100 microns in diameter may be present in the treatment fluid in an amount less than 0.5% by weight of the treatment fluid, less than 0.4% by weight of the treatment fluid, less than 0.3% by weight of the treatment fluid, less than 0.2% by weight of the treatment fluid, less than 0.1% by weight of the treatment fluid, or less than 0.01% by weight of the treatment fluid. In certain embodiments, the treatment fluid of the present disclosure does not include a proppant.

In one or more embodiments, the source of the polyvalent cation may be present in a treatment fluid in an amount within a range of from about 0.01% to about 20% by weight of the treatment fluid (e.g., up to about 1%, about 5%, about 10%, about 15%, about 20%, all by weight of the treatment fluid.). In certain embodiments, the source of the polyvalent cation may be present in an amount within a range of from about 0.01% to about 15% by weight of the treatment fluid, from about 1% to about 10% by weight of the treatment fluid, or from about 0.01 to about 5% by weight of the treatment fluid. In one or more embodiments, the source of the polyvalent cation may be present in a treatment fluid in an amount within a range of from about 1% to about 5% by weight of the treatment fluid.

In certain embodiments, the source of polyvalent cation may include a delayed source of a polyvalent cation, e.g., a material that releases or yields polyvalent cations after a delay period. For example, in certain embodiments, the delayed source of the polyvalent cation may be coated or encapsulated by a degradable material. Examples of degradable materials suitable for certain embodiments of the present disclosure include a resin, a lipid, an acrylic, polyvinylidene, any derivative of the foregoing, and any combination thereof. In certain embodiments, the degradable material may degrade under wellbore conditions, exposing the source of the polyvalent cation to one or more wellbore conditions. Exposure to the wellbore conditions may cause the source of the polyvalent cation to at least partially degrade or dissolve and release one or more polyvalent cations.

In certain embodiments, the treatment fluids of the present disclosure may include an acid precursor. In certain embodiments, "acid precursor" generally refers to a component which itself does not act as an acid by decreasing the pH of a solution into which it is introduced, but which, upon at least partial degradation, will yield one or more components capable of acting as an acid by decreasing the pH of that solution. For example, in certain embodiments, the acid precursor may at least partially degrade and generate an acid. In certain embodiments, the acid precursor may degrade in response to one or more wellbore conditions. For example, in certain embodiments, the acid precursor may at least partially degrade in response to thermal energy (e.g., the bottom hole temperature). In certain embodiments, the thermal energy that at least partially degrades the acid precursor may be generated by an exothermic reaction that occurs in the same fluid as the acid precursor, or occurs in a location near the acid precursor. For example, the treatment fluid of the present disclosure may include reactants that generate a delayed exothermic reaction. The thermal energy from that exothermic reaction may at least partially degrade the acid precursor. For example, in certain embodiments, sodium nitrite and ammonium chloride may be included in the treatment fluid and provide a delayed exothermic reaction. Examples of suitable commercially available delayed exothermic reaction reactants are the Sure-ThermSM line of service formulations, available from Halliburton Energy Services, Inc.

The acid generated by the acid precursor may, in certain embodiments, at least partially degrade the source of the polyvalent cation. In certain embodiments, the acid precursor is capable of sufficiently decreasing the pH of the treatment fluid to degrade or dissolve a significant amount of the source of the polyvalent cation. Acid precursors may degrade in response to wellbore conditions (e.g., temperature, pressure) or over time. In certain embodiments, the acid precursor is selected based, at least in part, on the concentration of the source of polyvalent cation.

In certain embodiments, the acid precursor may include an ester which may degrade into one or more acids, for example, by hydrolyzing with water. In certain embodiments, the acid precursor may include a lactone, a lactide, an acetate ester, a formate ester, a lactate ester, a polyester, an orthoester, or any combination thereof. Examples of acid precursors suitable for certain embodiments of the present disclosure include lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, potassium phosphate monobasic (KH2PO$_4$), phosphoric acid (H$_3$PO$_4$), ammonium phosphate monobasic (NH$_4$H$_2$PO$_4$, and any combination thereof. Examples of suitable acid precursors are commercially available from Halliburton Energy Services, Inc. as a part of the N-Flow™ line of service formulations. In certain embodiments, the acid precursor is selected based, at least in part, on the concentration of the delayed source of polyvalent ion. In certain embodiments, the acid precursor may degrade into formic acid. In certain embodiments, the formic acid is capable of reacting with calcium carbonate and magnesium carbonate, resulting in the release of Ca2+ or Mg2+ respectively. In certain embodiments, the acid precursor may degrade into lactice acid. In certain embodiments, the lactic acid is capable of reacting with calcium carbonate and magnesium carbonate, resulting in the release of Ca2+ or Mg2+ respectively.

For example, in certain embodiments, an acid precursor may yield one or more components capable of decreasing the pH of a solution by about 0.1 pH units, about 0.2 pH units, about 0.5 pH units, about 1.0 pH units, about 1.5 pH units, about 2.0 pH units, about 2.5 pH units, about 3.0 pH units, about 4.0 pH units, about 5.0 pH units, about 6.0 pH units, about 7.0 pH units, or more pH units.

In one or more embodiments, the acid precursor may be present in a treatment fluid in an amount within a range of from about 0.01% to about 20% by weight of the treatment fluid (e.g., up to about 1%, about 5%, about 10%, about 15%, about 20%, all by weight of the treatment fluid.). In certain embodiments, the acid precursor may be present in an amount within a range of from about 0.01% to about 15% by weight of the treatment fluid, from about 1% to about 10% by weight of the treatment fluid, or from about 0.01 to about 5% by weight of the treatment fluid. In one or more embodiments, the acid precursor may be present in a treatment fluid in an amount within a range of from about 2% to about 5% by weight of the treatment fluid.

In certain embodiments, the acid precursor may be a delayed acid precursor, e.g., a precursor that yields one or more components capable of acting as an acid after a delay period. For example, in certain embodiments, the acid precursor may be coated or encapsulated by a degradable material. Examples of degradable materials certain for certain embodiments of the present disclosure include a resin, a lipid, an acrylic, polyvinylidene, any derivative of the foregoing, and any combination thereof. In certain embodiments, the degradable material may degrade under wellbore conditions, which may allow the acid precursor to at least partially degrade and begin the generation of the one or more acids.

In certain embodiments, the treatment fluids of the present disclosure may include an acid inhibitor. In certain embodiments, the acid inhibitor may be an acid buffer, which may counteract the release of acid and stabilize the pH of the treatment fluid. In certain embodiments, the acid buffer may be a conjugated base of a weak acids. For example, acid buffers suitable for certain embodiments of the present disclosure include an acetate, a formate, a phosphate, a hydrogen phosphate, a dihydrogen phosphate, an amine, and any combination thereof. In certain embodiments, the acid inhibitor may include sodium bicarbonate or sodium carbonate. In one or more embodiments, the acid inhibitor may be present in a treatment fluid in an amount within a range of from about 0.01% to about 1% by weight of the treatment fluid (e.g. up to about 0.05%, about 0.1%, about 0.2%, about 0.5%, about 0.8%, all by weight of the treatment fluid.). In certain embodiments, the acid precursor may be present in an amount within a range of from about 0.01% to about 0.5% by weight of the treatment fluid, from about 0.1% to about 1% by weight of the treatment fluid, or from about 0.5 to about 1% by weight of the treatment fluid.

In certain embodiments, additives or properties of the treatment fluid may impact one or more properties of the set or partially set lost circulation material. For example, in certain embodiments, a gas-generating additive or a set of gas-generating reactants could be included in the treatment fluids of the present disclosure. Such additives may increase the amount of gas in the fluid, reducing the density of the set or partially set material. The strength of the set or partially set material may be increased in certain embodiments by, for example, increasing the polymer concentration in the treatment fluid, adding fibers to the fluid, and/or increasing the number of particles in the fluid.

In one or more embodiments, the treatment fluids before setting may have a density within a range of from about 7 lbs/gallon (ppg) to about 20 ppg or from about 9 ppg to about 15 ppg.

The treatment fluids used in the methods of the present disclosure may include any base fluid known in the art, including aqueous base fluids, non-aqueous base fluids, and any combination thereof. The term "base fluid" refers to the major component of the fluid (as opposed to components dissolved and/or suspended therein), and does not indicate any particular condition or property of that fluids such as its mass, amount, pH, etc.

Aqueous base fluids that may be suitable for use in the methods and systems of the present disclosure may include water from any source. Such aqueous fluids may include fresh water, field water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of acids and other additives included in the fluid. One of ordinary skill in the art, with the benefit of this disclosure, will recognize when such density and/or pH adjustments are appropriate. Water-based fluids suitable for certain embodiments of the present disclosure may include field water, sea water, brines, or any combination thereof.

Examples of non-aqueous base fluids suitable for certain embodiments of the present disclosure include natural oil based muds (OBM), synthetic based muds (SBM), natural base oils, synthetic base oils and invert emulsions. In certain embodiments, the non-aqueous base fluid may include any petroleum oil, natural oil, synthetically derived oil, or combinations thereof. In certain embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the treatment fluid itself or from the wellbore, or it may be intentionally added to affect the properties of the treatment fluid. Any known non-aqueous fluid may be used to form the external oil phase of the invert emulsion fluid. In certain embodiments, the non-aqueous base fluid does not include a significant amount of water.

In certain embodiments, the treatment fluids of the present disclosure may include a weighting agent. Examples of suitable weighting agents include barite, hematite, calcium carbonate, magnesium carbonate, iron carbonate, zinc carbonate, manganese tetraoxide, ilmenite, NaCl, KCl, formate salts, and the like, and any combination thereof. These weighting agents may be at least partially soluble or insoluble in the treatment fluid. In one or more embodiments, a weighting agent may be present in the treatment fluids in an amount within a range of from about 1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount within a range of from about 1% to about 35% by weight of the treatment fluid. In certain embodiments, the weighting agent may be present in the treatment fluids in an amount within a range of from about 1% to about 10% by weight of the treatment fluid (e.g., no more than 1%, 0.9%, 0.8%, 0.7%, 0.6%, or 0.5%, all by weight of the treatment fluid).

In certain embodiments, the treatment fluids of the present disclosure may include a density-reducing additive. Examples of density reducing additives suitable for certain embodiments of the present disclosure include, but are not limited to gas, suspension acids, defoamers, hollow glass beads, pozzolanic microspheres, solid beads (e.g., solid organic or plastic beads), or any combination thereof.

In certain embodiments, the treatment fluids of the present disclosure may include a polymeric fluid loss control additive. Examples of suitable polymeric fluid loss control additives include FILTER-CHEK™ fluid (i.e., carboxymethyl starch), N-DRIL™ HT PLUS fluid (i.e., a crosslinked corn starch), PAC™-L fluid (i.e., polyanionic cellulose), all of which are commercially available from Halliburton Energy Services, Inc., and combinations thereof.

In certain embodiments, the treatment fluid does not include a significant amount (e.g., no more than 0.5%, 0.4%, 0.3%, 0.2%, 0.1%, or 0.01%, all by weight of the treatment fluid) of a bridging agent. In some embodiments, the treatment fluid is free or substantially free of particulates other than the source of the polyvalent cation. In certain embodiments, the treatment fluids of the present disclosure may include additional lost circulation materials or bridging agents. In certain embodiments, additional lost circulation materials may be included in the compositions as a secondary mechanism to cure the losses without altering the thixotropic behavior of the treatment fluid. In certain embodiments, lost circulation materials may include STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® I 000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof. In certain embodiments, lost circulation materials may include synthetic or natural fibers. Examples of synthetic fibers suitable for certain embodiments of the present disclosure include polymers or copolymers composed of polypropylene, polyaramid, polyester, polyacrylonitrile, and polyvinyl alcohol. Examples of biodegradable fibers include fibers composed of modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of natural fibers suitable for certain embodiments of the present disclosure include fibers of cellulose including viscose cellulosic fibers, oil coated cellulosic fibers, and fibers derived from a plant product like paper fibers. Examples of other suitable fibers include carbon including carbon fibers; melt-processed inorganic fibers including basalt fibers, wollastonite fibers, non-amorphous metallic fibers, ceramic fibers, and glass fibers. The fibers may also be a composite fiber made from any combination of the preceding materials. A commercially-available example of suitable fibers is BAROLIFT®, sweeping agent, marketed by Halliburton Energy Services, Inc., which is a synthetic fiber. In certain embodiments, the fibers may have a length to diameter aspect ratio in the range of about 2:1 to about 5,000:1.

FIG. 1 depicts a process flow 110 for a method of drilling a borehole in a subterranean formation. In certain embodiments, the process flow 110 includes mixing, at the surface, a base fluid, a polyvalent cation reactive polymer, and a polyvalent cation source so as to form a treatment fluid 120. The process flow 110 may also include placing the treatment fluid in the subterranean formation so as to form a solid plug comprising the polyvalent cation reactive polymer crosslinked with the polyvalent cation 130. The process flow 110 may also include contacting the solid plug with a breaker so as to transform the solid plug into a reclaimed treatment fluid 140. The process flow 110 may also include removing the reclaimed treatment fluid from the subterranean formation.

FIG. 2 depicts a process flow 210 for placing the treatment fluid in the subterranean formation so as to form a solid plug comprising the polyvalent cation reactive polymer crosslinked with the polyvalent cation. In certain embodiments, the process flow 210 includes introducing a treatment fluid including a polyvalent cation reactive polymer, a source of a polyvalent cation, and an acid precursor into a wellbore penetrating at least a portion of a subterranean formation 220. The process flow may also include the acid precursor at least partially degrading 230. The acid precursor may degrade, at least in part, in response to thermal energy, such as the bottom hole temperature or an exothermic reaction. The degradation of the acid precursor 30 may release one or more acids 240. The source of the polyvalent cation may at least partially degrade or dissolve, at least in part, in response to the release of the one or more acids 250. The degradation of the source of the polyvalent cation 250 may release one or more polyvalent cations 260. The polyvalent cation reactive polymer in the treatment fluid may crosslink upon interaction with the one or more polyvalent cations 270, which may increase the viscosity of the treatment fluid. The treatment fluid may at least partially set in response to the crosslinking of the polymer 280. The set treatment fluid may be in the form of a solid plug.

Figure 3:
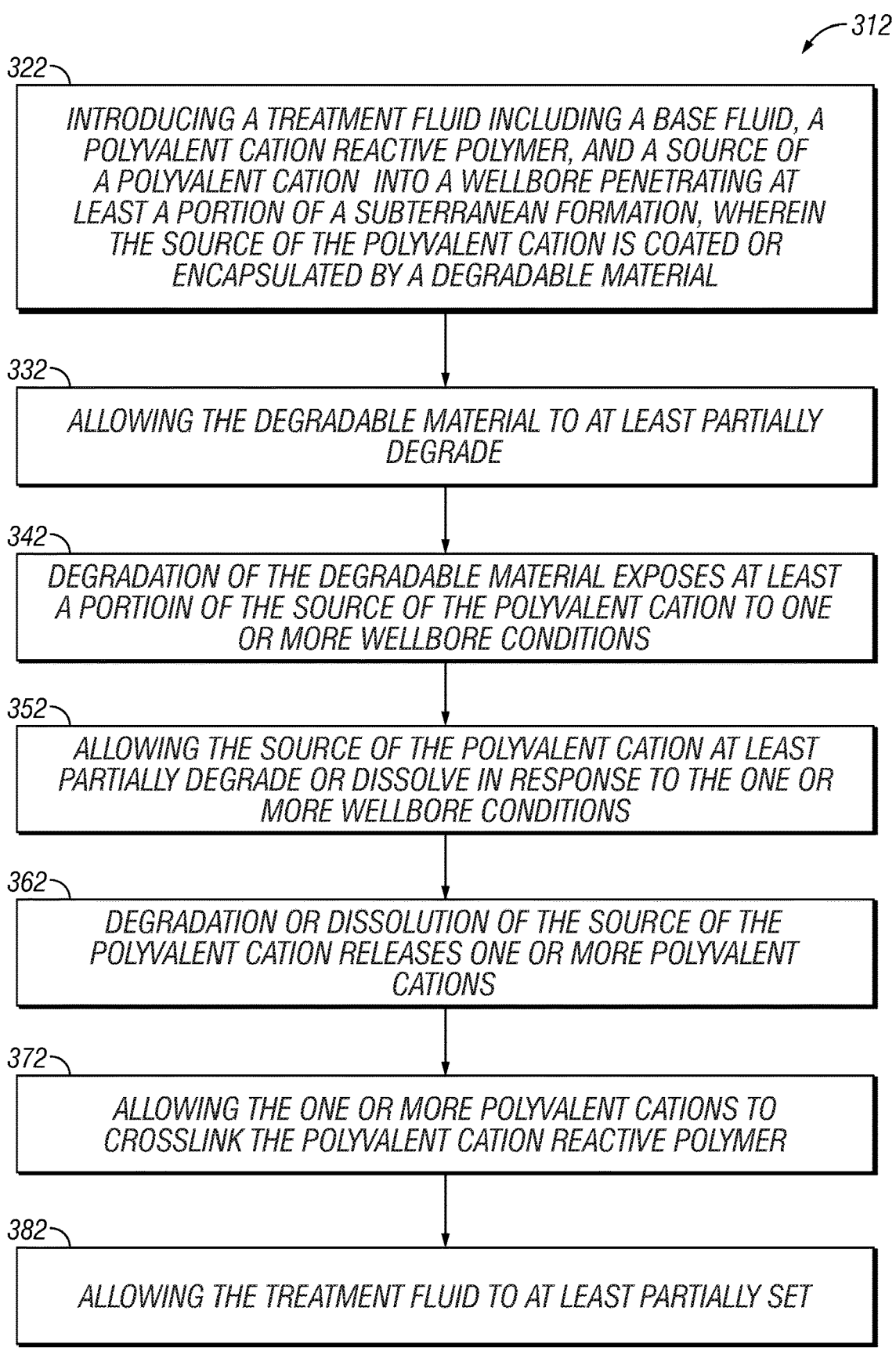
FIG. 3 is a process flow for placing a treatment fluid including a polyvalent cation reactive polymer and a coated or encapsulated source of the polyvalent cation in a subterranean formation in accordance with certain embodiments of the present disclosure.

FIG. 3 depicts another process flow 312 for placing the treatment fluid in the subterranean formation so as to form a solid plug comprising the polyvalent cation reactive polymer crosslinked with the polyvalent cation. In certain embodiments, the process flow 312 includes introducing a treatment fluid including a base fluid, a polyvalent cation reactive polymer, and a source of a polyvalent cation into a wellbore penetrating at least a portion of a subterranean formation, wherein the source of the polyvalent cation is coated or encapsulated by a degradable material 322. The process flow may also include the degradable material at least partially degrading 332. The degradable material may degrade, at least in part, in response to thermal energy, such as the bottom hole temperature or an exothermic reaction. The degradation of the degradable material 332 may expose at least a portion of the source of the polyvalent cation to one or more wellbore conditions 342. The source of the polyvalent cation may at least partially degrade or dissolve, at least in part, in response to one or more wellbore condition 352. The degradation or dissolution of the source of the polyvalent cation 352 may release one or more polyvalent cations 362. The polyvalent cation reactive polymer in the treatment fluid may crosslink upon interaction with the one or more polyvalent cations 372, which may increase the viscosity of the treatment fluid. The treatment fluid may at least partially set in response to the crosslinking of the polymer 382. The set treatment fluid may be in the form of a solid plug.

In certain embodiments, the methods of the present disclose may include introducing at least a portion of the treatment fluids into a loss zone or other flowpath and causing or allowing the treatment fluid to at least partially set (e.g., form a solid, semi-solid, gel, plug, etc.). In certain embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss-circulation zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In certain embodiments, one or more treatment fluids may at least partially plug a loss zone. In certain embodiments, a composition of the present disclosure may set and at least partially plug a loss zone.

In certain embodiments, the treatment fluid or compositions of the present disclosure may be removed from the subterranean formation and/or the loss zone by a method that combines re-fluidization with other techniques of removal. For example, in certain embodiments, the set treatment fluid or composition may be removed from the loss zone by flowing back the well. Alternatively or in combination, in certain embodiments, the treatment fluid or composition of the present disclosure may be degraded or dissolved. Such degradation or dissolution may occur over time, in response to contacting the treatment fluid or composition with an acidic fluid, or in response to one or more downhole conditions (e.g., bottomhole temperature).

In certain embodiments, the treatment fluids of the present disclosure may be suitable for use at a variety of temperatures, pH levels, water salinities, and mineralogies of subterranean formations. In certain embodiments, the materials that make up the treatment fluids may at least partially set and/or be stable at high temperatures. In certain embodiments, the materials that make up the treatment fluids function at temperatures above 90° F. and above 260° F. In certain embodiments, the methods of present disclosure allow the faster reaction rate of the formation of acid from the acid precursor caused by higher temperatures to be acceptable because the reaction is slower than other lost circulation compositions. Thus, in certain embodiments, the treatment fluids and methods of the present disclosure may provide effective loss zone treatment, plug formation, and other wellbore treatment, even when used in conditions at or above 260° F. Moreover, the properties of treatment fluids may be effective over a range of pH levels. For example, in certain embodiments, the treatment fluids may provide effective fluid displacement and loss zone treatment from a pH within a range of about 6 to about 10, or from about 6 to about 8. Additionally, the treatment fluids of the present disclosure may be suitable for a variety of subterranean formations, including, but not limited to shale formations and carbonate formations.

In certain embodiments, the treatment fluids of the present disclosure optionally may include any number of additional additives. Examples of such additional additives include salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, H2S scavengers, C02 scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In certain embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In certain embodiments, the treatment fluid may be introduced into a wellbore that penetrates a subterranean formation. In certain embodiments, a wellbore may be drilled and the treatment fluid may be circulated in the wellbore during, before, or after the drilling. In certain embodiments, the treatment fluid is introduced into a subterranean formation via a single flow path (e.g., drill pipe, annulus, etc.).

The methods and compositions of the present invention may be used in full-scale operations or pills. As used herein, a "pill" is a type of relatively small volume of specially prepared treatment fluid placed or circulated in the wellbore. The pill may have a non-zero volume less than 200 barrels, or less than 100 barrels, or less than 5 barrels. The pill is mixed and placed on its own separate from the main drilling fluid. Boring the wellbore, via rotation of the bit, may be suspended for placement of the pill.

The treatment fluids disclosed herein may directly or indirectly affect one or more components or pieces of equipment associated with the preparation, delivery, recapture, recycling, reuse, and/or disposal of the disclosed treatment fluids. For example, the methods and compositions of the present disclosure may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other well bore isolation devices, or components, and the like. In certain embodiments, the treatment fluid is introduced into a wellbore using one or more pumps.

Figure 4:
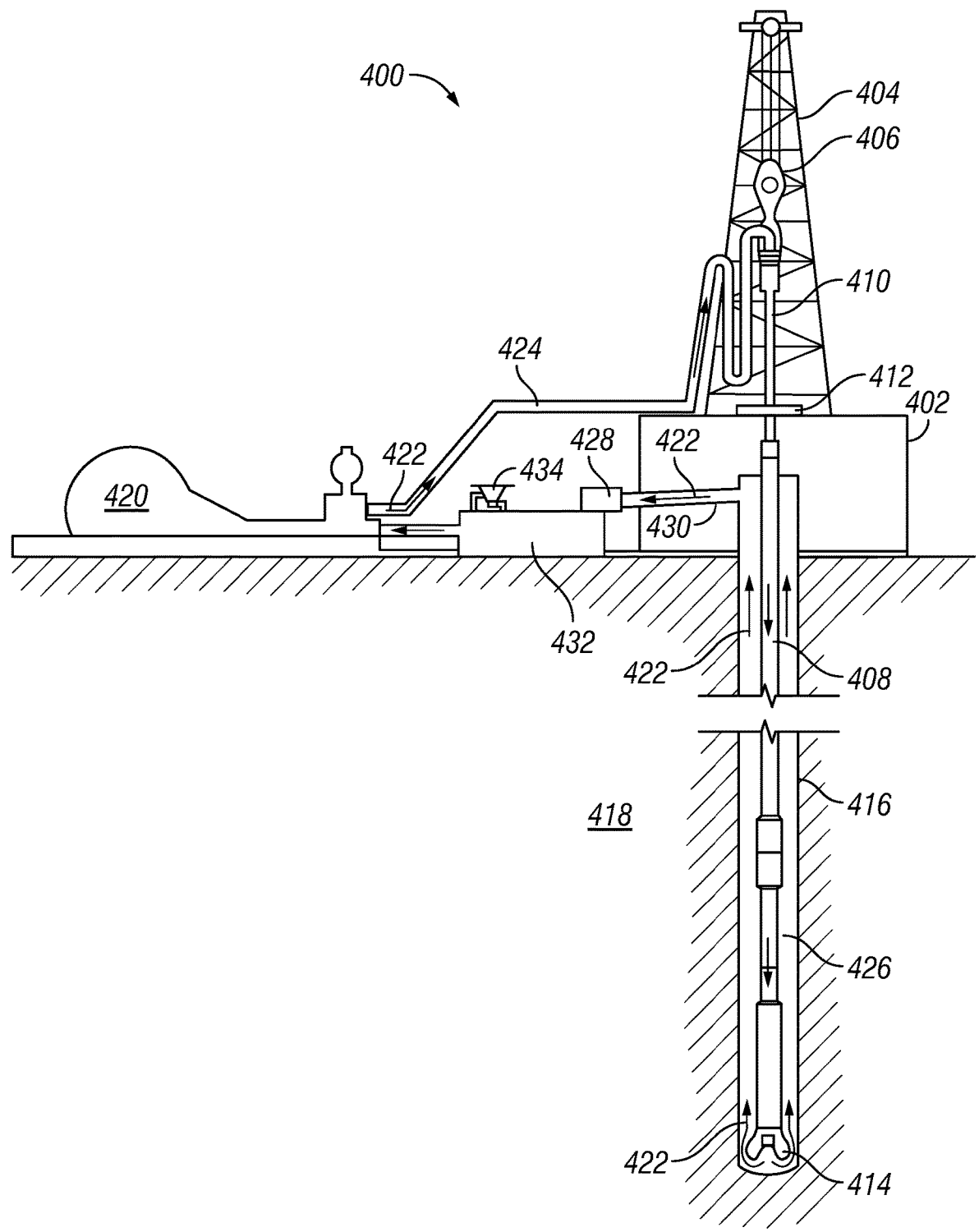
FIG. 4 is a schematic diagram of a land-based system that may deliver lost circulation materials of the present disclosure to a downhole location in accordance with certain embodiments of the present disclosure.
Figure 5:
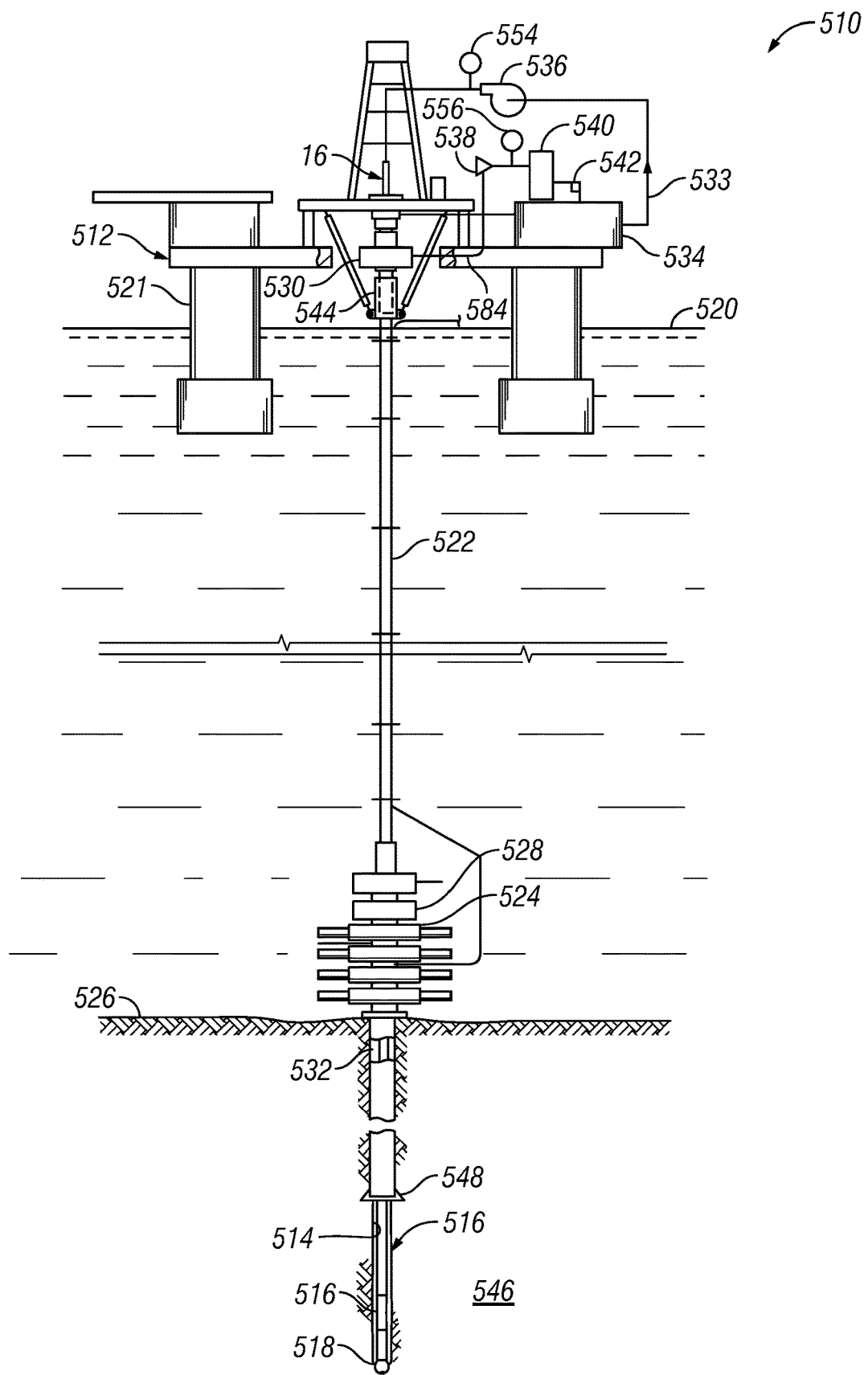
FIG. 5 is a schematic diagram of a sea-based system that may deliver lost circulation materials of the present disclosure to a downhole location in accordance with certain embodiments of the present disclosure.

For example, and with reference to FIG. 4, the treatment fluids of the present disclosure may directly or indirectly affect one or more components or pieces of equipment associated with an exemplary wellbore drilling assembly 400, of one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure, for example as shown in FIG. 5.

As illustrated, the drilling assembly 400 may include a drilling platform 102 that supports a derrick 404 having a traveling block 406 for raising and lowering a drill string 408. The drill string 408 may include drill pipe and coiled tubing, as generally known to those skilled in the art. A kelly 410 supports the drill string 108 as it is lowered through a rotary table 412. A drill bit 414 is attached to the distal end of the drill string 408 and is driven either by a downhole motor and/or via rotation of the drill string 408 from the well surface. As the bit 414 rotates, it creates a wellbore 416 that penetrates various subterranean formations 418.

A pump 420 (e.g., a mud pump) circulates wellbore fluid 422 (e.g., a drilling fluid or a lost circulation pill described herein) through a feed pipe 424 and to the kelly 410, which conveys the wellbore fluid 422 downhole through the interior of the drill string 408 and through one or more orifices in the drill bit 414 (or optionally through a bypass or ports (not shown) along the drill string and above the drill bit 414). The wellbore fluid 422 is then circulated back to the surface via an annulus 426 defined between the drill string 408 and the walls of the wellbore 416. At the surface, the recirculated or spent wellbore fluid 422 exits the annulus 426 and may be conveyed to one or more fluid processing unit(s) 428 via an interconnecting flow line 430. After passing through the fluid processing unit(s) 428, a "cleaned" wellbore fluid 422 is deposited into a nearby retention pit 432 (e.g., a mud pit). While illustrated as being arranged at the outlet of the wellbore 416 via the annulus 426, those skilled in the art will readily appreciate that the fluid processing unit(s) 428 may be arranged at any other location in the drilling assembly 400 to facilitate its proper function, without departing from the scope of the scope of the disclosure. Drill string 408 is illustrative of a tubular.

One or more of the treatment fluids of the present disclosure may be added to the wellbore fluid 422 via a mixing hopper 434 communicably coupled to or otherwise in fluid communication with the retention pit 432. The mixing hopper 434 may include mixers and related mixing equipment known to those skilled in the art. In other embodiments, however, the lost circulation materials of the present disclosure may be added to the wellbore fluid 422 at any other location in the drilling assembly 400. In at least one embodiment, for example, there could be more than one retention pit 432, such as multiple retention pits 432 in series. Moreover, the retention pit 432 may be representative of one or more fluid storage facilities and/or units where the lost circulation materials of the present disclosure may be stored, reconditioned, and/or regulated until added to the wellbore fluid 422. Retention pit 432 is illustrative of a container.

As mentioned above, the lost circulation materials of the present disclosure may directly or indirectly affect the components and equipment of the drilling assembly 400. For example, the lost circulation materials of the present disclosure may directly or indirectly affect the fluid processing unit(s) 128 which may include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 428 may further include one or more sensors, gauges, pumps, compressors, and the like used store, monitor, regulate, and/or recondition the exemplary lost circulation materials.

The lost circulation materials of the present disclosure may directly or indirectly affect the pump 420, which representatively includes any conduits, pipelines, trucks, tubulars, and/or pipes used to fluidically convey the lost circulation materials downhole, any pumps, compressors, or motors (e.g., topside or downhole) used to drive the lost circulation materials into motion, any valves or related joints used to regulate the pressure or flow rate of the lost circulation materials, and any sensors (i.e., pressure, temperature, flow rate, etc.), gauges, and/or combinations thereof, and the like. The lost circulation materials of the present disclosure may also directly or indirectly affect the mixing hopper 434 and the retention pit 432 and their assorted variations. The lost circulation materials of the present disclosure may also directly or indirectly affect the various downhole equipment and tools that may come into contact with the lost circulation materials such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The lost circulation materials of the present disclosure may also directly or indirectly affect any downhole heat exchangers, valves and corresponding actuation devices, tool seals, packers and other wellbore isolation devices or components, and the like associated with the wellbore 416. The lost circulation materials of the present disclosure may also directly or indirectly affect the drill bit 414, which may include roller cone bits, PDC bits, natural diamond bits, any hole openers, reamers, coring bits, etc.

In the sea-based drilling system 500 depicted in FIG. 5, a floating rig 512 including a floating vessel 521 is used to drill a borehole 514 in formation 546. A generally tubular drill string 516 has a drill bit 518 connected at a lower end thereof, and the drill bit is rotated and/or otherwise operated to drill the borehole 514. The floating vessel 521 is positioned at a surface location 520.

In FIG. 5, a marine riser 522 extends between the rig 512 and a blowout preventer stack 524 positioned at a subsea location (e.g., at a mud line or on a seabed 526). The riser 522 serves as a conduit for guiding the drill string 516 between the rig 512 and the blowout preventer stack 524, for flowing fluids between the rig and the borehole 514, etc. The floating vessel 521 is connected to the marine riser 522 via a telescoping joint 544 (also known as a sliding joint or a slip joint), in order to accommodate vertical motion of the vessel 521 due to wave and tide influence.

Interconnected between the riser 522 and the blowout preventer stack 524 is an annular blowout preventer 528. The annular blowout preventer 528 is designed to seal off an annulus 532 about the drill string 516 in certain situations (e.g., to prevent inadvertent release of fluids from the well in an emergency, etc.), although a typical annular blowout preventer can seal off the top of the blowout preventer stack 524 even if the drill string is not present in the annular blowout preventer. Near an upper end of the riser 522 is an annular sealing device 530, which is also designed to seal off the annulus 532 about the drill string 516.

Drilling fluid 533 is contained in a reservoir 534 of the rig 512. A rig pump 536 is used to pump the drilling fluid 533 into the drill string 516 at the surface. The drilling fluid flows through the drill string 516 and into the borehole 514 (e.g., exiting the drill string at the drill bit 518). The reservoir 534 is illustrative of a container and the drill string 516 is illustrative of a tubular.

The shale inhibitor may be added to the drilling fluid 533 via reservoir 534 or another container, such as a mixing hopper (not shown) communicably coupled to or otherwise in fluid communication with the reservoir 534. The mixing hopper may include mixers and related mixing equipment known to those skilled in the art. Alternatively or in combination, the disclosed shale inhibitor may be added to the drilling fluid 533 at any other location in the floating rig 512. For example, there could be more than one reservoir 534, such as multiple reservoirs 534 in series. Moreover, the reservoirs 534 may be representative of one or more fluid storage facilities and/or units where the disclosed shale inhibitor may be stored, reconditioned, and/or regulated until added to the drilling fluid 523. Reservoir 534 is illustrative of a container.

The drilling fluid 533 then exits the drill bit 518 and flows through the annulus 532 back to the reservoir 534 via a choke manifold 538, a gas buster or "poor boy" degasser 540, a solids separator 542, etc. Measurements of flow rate into the well and flow rate from the well could be obtained, for example, by use of flowmeters 554, 556. However, it should be understood that other types and combinations of drilling fluid handling, conditioning and processing equipment may be used within the scope of this disclosure.

A pressure control system (not shown) can be used to control pressure in the borehole 514. The pressure control system can operate the choke manifold 538, so that a desired amount of backpressure is applied to the annulus 532. The pressure control system may regulate operation of other equipment (e.g., the pump 536, a standpipe control valve, a diverter which diverts flow from the pump 536 to a drilling fluid return line 584 upstream of the choke manifold 538, etc.), as well.

Certain embodiments of the present disclosure provide a method that includes mixing, at the surface, a base fluid, a polyvalent cation reactive polymer, and a polyvalent cation source so as to form a treatment fluid; placing the treatment fluid in the subterranean formation so as to form a solid plug including the polyvalent cation reactive polymer crosslinked with the polyvalent cation; contacting the solid plug with a breaker so as to transform the solid plug into a reclaimed treatment fluid; and removing the reclaimed treatment fluid from the subterranean formation.

In certain embodiments, the method includes repeating the placing, contacting, and removing with the reclaimed treatment fluid as the treatment fluid. In certain embodiments, the method includes an additional amount of the polyvalent cation source is mixed into the reclaimed treatment fluid. In certain embodiments, the method includes suspecting the rotation of a drill bit during the mixing, placing, contacting, and removing.

Certain embodiments of the present disclosure provide a system that includes a treatment fluid, at the surface, including a polyvalent cation reactive polymer, and a source of a polyvalent cation, where the treatment fluid is settable in the formation to form a solid plug including the polyvalent cation reactive polymer and the polyvalent cation; and a breaker, separate from the treatment fluid at the surface, capable of liquefying the solid plug in the subterranean formation.

In certain embodiments, the system includes a container capable of dispensing the treatment fluid; and a tubular disposed in the borehole and in fluid communication with the container, and including an end in proximity to the formation.

In certain embodiments, the breaker includes a chelator. In certain embodiments, the chelator is selected from the group consisting of citrate, N,N-dicarboxymethyl glutamic acid tretrasodium salt (GLDA), ethylenediaminetretraacetic acid (EDTA), diethylenetriaminepentaacetic acid (DTPA), nitrilotriacetic acid (NTA), trans-1,2-cyclohexanediamine-n,n,n',n'-tetraacetic acid (CyDTA), ethylene glycol-bis(β-aminoethyl ether)-N,N,N,N-tetraacetic acid (EGTA), Triethylenetetramine-N,N,N',N'',N''',N'''-hexaacetic acid (TTHA), iminodiacetic acid (IDA), 1,2-bis(o-aminophenoxy)ethane-N,N,N',N'-tetraacetic acid (BAPTA), and combinations thereof.

In certain embodiments, the treatment fluid is a pill fluid. In certain embodiments, the treatment fluid has a non-zero volume less than 200 barrels, or less than 100 barrels, or less than 5 barrels.

In certain embodiments, the treatment fluid includes an acid precursor convertible to the acid at a temperature of the subterranean formation so as to react with the delayed source of polyvalent cation to produce the polyvalent cation. In certain embodiments, the treatment fluid includes exothermic reaction additives, and the placing includes allowing the exothermic reaction additives to react to provide the temperature. In certain embodiments, the method includes converting an acid precursor to the acid at a temperature of the subterranean formation so as to react with the delayed source of polyvalent cation to produce the polyvalent cation.

Thus, certain embodiments of the present disclosure provide a method that includes forming a treatment fluid including a base fluid, a delayed source of a polyvalent cation, a polyvalent cation reactive polymer, and an acid precursor; introducing the treatment fluid into a wellbore penetrating at least a portion of a subterranean formation; and allowing the treatment fluid to at least partially set.

Certain embodiment of the present disclosure provide a treatment fluid composition that includes a base fluid; a delayed source of a polyvalent cation; a polyvalent cation reactive polymer including alginate; and an acid precursor.

In certain embodiments, the delayed polyvalent cation source is encapsulated by a degradable coating providing delayed release of the delayed source of polyvalent cation. In certain embodiments, the coating includes a coating material selected from the group consisting of resins, lipids, acrylics, polyvinylidene chloride (PVdC), urea-formaldeye, and combinations thereof. In certain embodiments, the method includes delaying a release of the polyvalent cation source by encapsulating the polyvalent cation source with a degradable coating.

Thus, certain embodiments of the present disclosure provide a method that includes forming a treatment fluid including a base fluid, a source of a polyvalent cation, and a polyvalent cation reactive polymer, wherein the source of the polyvalent cation is coated or encapsulated by a degradable material; introducing the treatment fluid into a wellbore penetrating at least a portion of a subterranean formation; and allowing the treatment fluid to at least partially set.

Certain embodiment of the present disclosure provide a treatment fluid composition that includes a base fluid; a polyvalent cation reactive polymer including alginate; and a source of a polyvalent cation encapsulated by a coating.

In certain embodiments, the at least partially set treatment fluid at least partially plugs a loss zone in the subterranean formation. In certain embodiments, the treatment fluid is introduced into the wellbore using one or more pumps. In certain embodiments, the treatment fluid is introduced into the wellbore using one or more tubulars. In certain embodiments, the treatment fluid is introduced into the wellbore using one or more containers.

In certain embodiments, the polyvalent cation is a polyvalent metal cation. In certain embodiments, the source of the polyvalent cation includes particles sized within a range of from about 1 to about 2,000 microns or fibers with a diameter of from about 1 micron to about 20 microns and a length of from about 1 micron to about 25,000 microns. In one or more embodiments described above, the composition does not include a significant amount of particles sized greater than 1,000 microns in diameter.

In one or more embodiments described above, the delayed source of the polyvalent cation is present in the treatment fluid in an amount within a range of from about 0.01% to about 20% by weight of the treatment fluid. In one or more embodiments described above, the delayed source of the polyvalent cation includes a salt selected from the group consisting of: calcium carbonate, calcium sulfate-hydrate, magnesium carbonate, calcium oxide, magnesium oxide, calcium hydroxide, magnesium hydroxide, barium sulfate, or any combination thereof. In one or more embodiments described above, the delayed source of the polyvalent action includes an acid-soluble mineral fiber.

In certain embodiments, the polyvalent cation reactive polymer is selected from the group consisting of: carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate any derivative of the foregoing, and any combination thereof. In one or more embodiments described above, the treatment fluid does not include a significant amount of particles sized greater than 1,000 microns in diameter. In one or more embodiments described above, the polyvalent cation reactive polymer is present in the treatment fluid in an amount within a range of from about 0.01% to about 40% by weight of the treatment fluid.

In certain embodiments, when the treatment fluid includes an acid precursor, the method further includes allowing the acid precursor to at least partially degrade and release one or more acids; allowing the one or more acids to at least partially degrade or dissolve the source of the polyvalent cation, wherein the degradation or dissolution of the source of the polyvalent cation releases one or more polyvalent cations; and allowing the one or more polyvalent cations to crosslink the polyvalent cation reactive polymer. In one or more embodiments described above, the crosslinking of the polyvalent cation reactive polymer causes the treatment fluid to at least partially set. In one or more embodiments described above, the acid precursor is present in the treatment fluid in an amount within a range of from about 0.01% to about 20% by weight of the treatment fluid. In one or more embodiments described above, the acid precursor is selected from the group consisting of: a lactone, a lactide, an acetate ester, a formate ester, a lactate ester, a polyester, an orthoester, or any combination thereof.

In certain embodiments, a treatment system includes the chelator includes EDTA, the polyvalent cation reactive polymer includes alginate, the polyvalent cation source includes calcium carbonate, and the treatment fluid includes a formic acid ester and/or lactic acid ester.

In certain embodiments, a treatment fluid composition includes an aqueous base fluid; calcium carbonate; a polyvalent cation reactive polymer including alginate, and an acid precursor.

To facilitate a better understanding of the present disclosure, the following examples of certain aspects of preferred embodiments are given. The following examples are not the only examples that could be given of the present disclosure and are not intended to limit the scope of the disclosure or claims.

EXAMPLES

Example 1

In this example, a series of control experiments were performed with various combinations of a polyvalent cation reactive polymer (alginate), a source of a polyvalent cation, and/or an acid. After heating to 150° F. for 16 hours, a solution of alginate and calcium carbonate (without an acid or acid precursor) remained a fluid and the alginate exhibited no crosslinking. Thus, calcium carbonate exemplifies a delayed source of polyvalent cation. In contrast, at room temperature, an aqueous solution of sodium alginate and calcium chloride rapidly formed a highly cross-linked polymer. Thus, calcium chloride, when it is not encapsulated, exemplifies a non-delayed source of polyvalent cation. Alternately, encapsulated calcium chloride would exemplify a delayed source of polyvalent cation. An aqueous solution of alginate, calcium carbonate, and acetic acid also rapidly formed a highly cross-linked polymer at room temperature. Thus, the acetic acid released the exemplary polyvalent cation, calcium, from the exemplary delayed source of polyvalent cation, calcium carbonate. These results demonstrate that a solution of a polyvalent cation reactive polymer and a delayed source of polyvalent cation may not crosslink without the presence of an acid or acid precursor. Additionally, these results demonstrate that a solution of a polyvalent cation reactive polymer, a source of polyvalent cation, and an acid (not an acid precursor) may react very rapidly.

Example 2

The following series of tests were performed to evaluate the rheology of comparative treatment fluids including aqueous alginate, a source of a polyvalent cation (BARACARB®, available commercially from Halliburton), and two different formic acid precursors. The formic acid precursors are illustrative of acid precursors providing different gel times. Four sample treatment fluids were prepared as indicated in Table 1 below.

TABLE 1

| Component | Fluid #1 | Fluid #2 | Fluid #3 | Fluid #4 |
|---|---|---|---|---|
| Water, g | 350 | 350 | 350 | 350 |
| Sodium alginate, g | 5 | 5 | 5 | 5 |
| BARACARB ® 5, g | 5 | 5 | — | 5 |
| BARACARB ® 50, g | — | — | 2 | — |
| Sodium bicarbonate, g | — | 0.025 | — | — |
| Formic acid precursor 1, g | 1 | 1 | 1 | — |
| Formic acid precursor 2, g | — | — | — | 1 |

In this example, thixotropic behavior is quantified for the compositions described in Table 1 based on American Petroleum Institute ("API") rheology measured as rpm versus dial reading using a FANN viscometer, and based on the API gel strength measured in $lb_f/100\ ft^2$, of American Petroleum Institute Recommended Practice 13B-1: Recommended Practice for Field Testing Water-Based Drilling Fluids. Dial readings were taken for each composition using a FANN 45 Viscometer at 70° F. at speeds of 600, 300, 200, 100, 6, and 3 rotations per minute ("rpm"). Gel strength measurements were taken at 10 seconds, 10 minutes, and 30 minutes for each composition.

As shown in Table 2, fluids including the formic acid precursor 1, BARACARB® 5, and alginate (Fluids #1 and #2 in Table 1) gelled relatively quickly, showing significant crosslinking even at the 30 minute gel strength measurement. Replacing BARACARB® 5 (having a d50 particle size of 5 microns) with BARACARB® 50 (having a d50 particle size of 50 microns) at a reduced concentration, as exhibited by Fluid #3, reduced the initial gelation time. Fluid #3 still fully set after 16 hours at 150° F. Use of formic acid precursor 2 (Fluid #4) provided enough delay that neither the calcium carbonate particle size nor the calcium carbonate concentration needed to be adjusted to delay gelation. Fluid #4 was fully set after 16 hours at 150° F.

TABLE 2

| 21° C. (70° F.) 150Rheology | Fluid #1 | Fluid #2 | Fluid #3 | Fluid #4 |
|---|---|---|---|---|
| 600 rpm | 233 | 238 | 252 | 260 |
| 300 rpm | 174 | 174 | 184 | 191 |
| 200 rpm | 143 | 142 | 147 | 154 |
| 100 rpm | 99 | 97 | 97 | 101 |
| 6 rpm | 16 | 13 | 10 | 11 |
| 3 rpm | 11 | 9 | 5 | 6 |
| 10 sec gel | 16 | 13 | 3 | 6 |
| 10 min gel | 271 | 279 | 9 | 6 |
| 30 min gel | 987 | 1878 | 15 | 6 |

Example 3

Figure 6A:
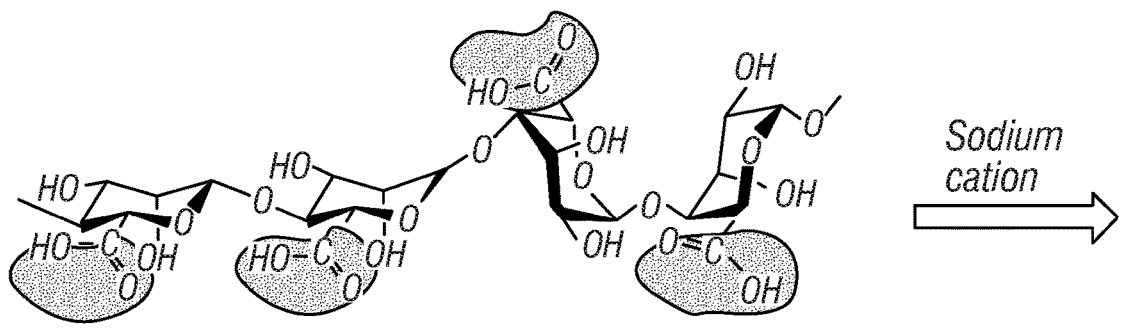
FIG. 6A is a first portion of a schematic diagram of the reactive processes for forming and re-fluidizing calcium-crosslinked alignate of an example of the present disclosure, illustrating the alignate.
Figure 6B:
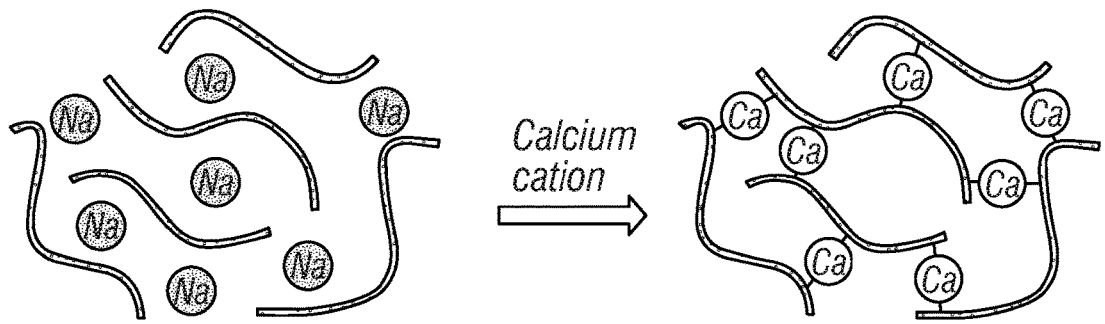
FIG. 6B is a second portion of a schematic diagram of the reactive processes for forming and re-fluidizing calcium-crosslinked alignate of an example of the present disclosure, illustrating forming the calcium-crosslinked alignate.
Figure 6C:
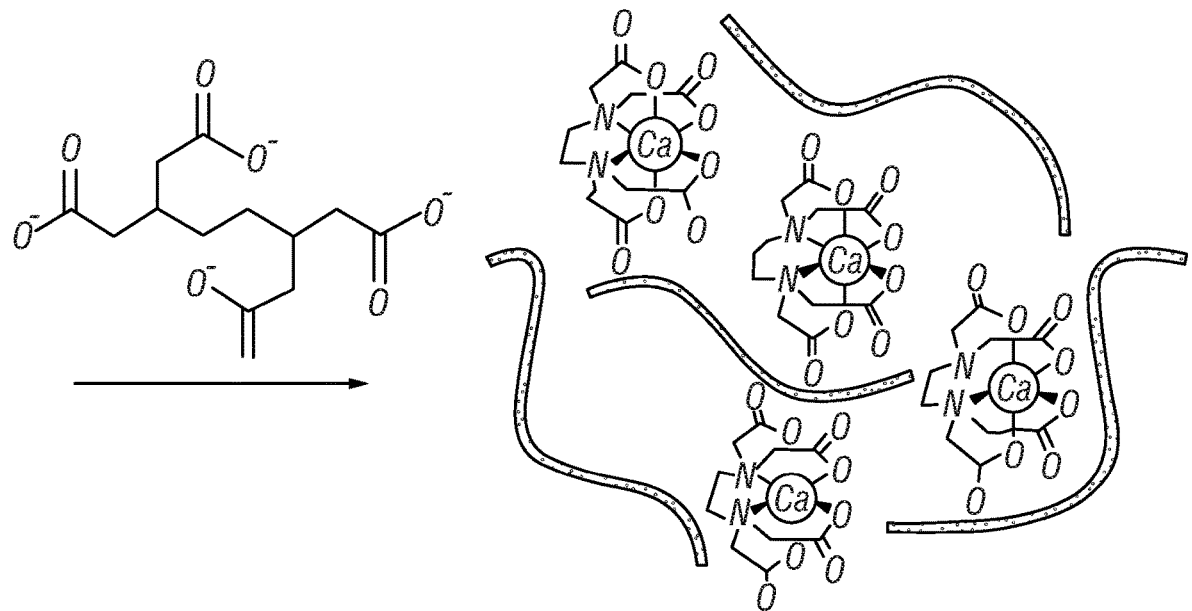
FIG. 6C is a third portion of a schematic diagram of the reactive processes for forming and re-fluidizing calcium-crosslinked alignate of an example of the present disclosure, illustrating re-fluidizing the alignate.

As illustrated schematically in FIGS. 6A, 6B, 6C, 350 mL water, 5 grams sodium alginate, which can be formed from alginic acid and sodium cation (FIG. 6A), 0.5 gm CaCO₃ (BARACARB 5), and 1 mL formic acid precursor 1 was mixed together. The mixture was observed to be initially fluid. The fluid was heated at 65.5° C. (150° F.) for 16 hours, which released the calcium cation from the source of calcium cation (CaCO₃). A homogeneously cross-linked material formed having a defined shape based on the container. This illustrates crosslinking to set, forming a solid (FIG. 6B). 3 grams of solid EDTA was added to the solid (FIG. 6C). The solid shape was observed to re-fluidize after rolling the sample overnight. This illustrates formation of a reclaimed fluid. An additional amount of 5 gm CaCO₃ (BARACARB 5) and 1 mL of formic acid precursor 1 was mixed into the reclaimed fluid, which was then heated again at 65.5° C. (150° F.) for 16 hours. A homogeneously cross-linked material re-formed having a defined shape based on the container. This illustrates repeating the process to reuse the fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. The terms in the claims have their plain, ordinary meaning unless otherwise explicitly and clearly defined by the patentee.

What is claimed is:

1. A method of drilling a borehole in a subterranean formation from the Earth's surface, comprising:
   mixing, at the surface, a base fluid, a polyvalent cation reactive polymer, an acid precursor, and a delayed source of polyvalent cation so as to form a treatment fluid;
   placing the treatment fluid in the subterranean formation;
   at least partially degrading the acid precursor to an acid at a temperature of the subterranean formation so as to react the acid with the delayed source of polyvalent cation to form a polyvalent cation;
   forming a solid plug comprising the polyvalent cation reactive polymer crosslinked with the polyvalent cation;
   contacting the solid plug with a breaker so as to transform the solid plug into a reclaimed treatment fluid; and
   removing the reclaimed treatment fluid from the subterranean formation.

2. The method of claim 1, wherein the method further comprises repeating the placing, contacting, and removing with the reclaimed treatment fluid as the treatment fluid.

3. The method of claim 2, further comprising mixing, at the surface, an additional amount of one or more of the delayed source of polyvalent cation, the polyvalent cation reactive polymer, and the base fluid into the reclaimed treatment fluid.

4. The method of claim 1, wherein breaker comprises a chelator selected from the group consisting of citrate, N,N-dicarboxymethyl glutamic acid tretrasodium salt (GLDA), ethylenediaminetretraacetic acid (EDTA), diethylenetriaminepentaacetic acid (DTPA), nitrilotriacetic acid (NTA), trans-1,2-cyclohexanediamine-n,n,n',n'-tetraacetic acid (CyDTA), ethylene glycol-bis(β-aminoethyl ether)-N,N,N,N-tetraacetic acid (EGTA), Triethylenetetramine-N,N,N',N'',N''',N''''-hexaacetic acid (TTHA), Iminodiacetic acid (IDA), 1,2-bis(o-aminophenoxy)ethane-N,N,N',N'-tetraacetic acid (BAPTA), and combinations thereof.

5. The method of claim 1, wherein the polyvalent cation is a polyvalent metal cation.

6. The method of claim 1, wherein the polyvalent cation reactive polymer is selected from the group consisting of carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate derivatives thereof, and combinations thereof.

7. The method of claim 1, wherein the treatment fluid further comprises exothermic reaction additives, and wherein the placing comprises allowing the exothermic reaction additives to react to provide the temperature.

8. The method of claim 1, further comprising delaying a release of the delayed source of polyvalent cation by encapsulating the delayed source of polyvalent cation with a degradable coating.

9. The method of claim 8, wherein the coating comprises a coating material selected from the group consisting of resins, lipids, acrylics, polyvinylidene chloride (PVdC), urea-formaldedye, and combinations thereof.

10. The method of claim 1, wherein the chelator comprises EDTA, the polyvalent cation reactive polymer comprises alginate, the polyvalent cation source comprises calcium carbonate, the treatment fluid further comprises a formic acid ester and/or lactic acid ester.

11. The method of claim 10, further comprising:
    suspending rotation of a drill bit during the mixing, placing, contacting, and removing; and
    mixing, at the surface, an additional amount of one or more of the delayed source of polyvalent cation, the polyvalent cation reactive polymer, and the base fluid into the reclaimed treatment fluid.

12. A method of drilling a borehole in a subterranean formation from the Earth's surface, comprising:
    mixing, at the surface, a base fluid, a polyvalent cation reactive polymer, an acid precursor, and a delayed source of polyvalent cation so as to form a treatment fluid, wherein the delayed source of polyvalent cation comprises a salt of a polyvalent metal cation;
    placing the treatment fluid in the subterranean formation;
    at least partially degrading the acid precursor to an acid at a temperature of the subterranean formation so as to react the acid with the delayed source of polyvalent cation to form a polyvalent cation;
    forming a solid plug comprising the polyvalent cation reactive polymer crosslinked with the polyvalent cation;
    contacting the solid plug with a breaker so as to transform the solid plug into a reclaimed treatment fluid; and
    removing the reclaimed treatment fluid from the subterranean formation.

13. The method of claim 12, wherein breaker comprises a chelator selected from the group consisting of citrate, N,N-dicarboxymethyl glutamic acid tretrasodium salt (GLDA), ethylenediaminetretraacetic acid (EDTA), diethylenetriaminepentaacetic acid (DTPA), nitrilotriacetic acid (NTA), trans-1,2-cyclohexanediamine-n,n,n',n'-tetraacetic acid (CyDTA), ethylene glycol-bis(β-aminoethyl ether)-N, N,N,N'-tetraacetic acid (EGTA), Triethylenetetramine-N,N,N',N'',N''',N'''-hexaacetic acid (TTHA), Iminodiacetic acid (IDA), 1,2-bis(o-aminophenoxy)ethane-N,N,N',N'-tetraacetic acid (BAPTA), and combinations thereof.

14. The method of claim 12, wherein the polyvalent cation reactive polymer is selected from the group consisting of carrageenan, pectin, algin, alginate, carboxymethylcellulose, carboxymethyl hydroxypropyl guar, carboxymethyl hydroxyethyyl guar, xanthan, diutan, carboxymethylhydroxylcellulose, carboxymethyl starch, partially hydrolyzed polyacrylamide, polyacrylic acid, polyacrylate derivatives thereof, and combinations thereof.

15. The method of claim 12, further comprising repeating the placing, contacting, and removing with the reclaimed treatment fluid as the treatment fluid.

16. The method of claim 12, further comprising:
suspending rotation of a drill bit during the mixing, placing, contacting, and removing; and
mixing, at the surface, an additional amount of one or more of the delayed source of polyvalent cation, the polyvalent cation reactive polymer, and the base fluid into the reclaimed treatment fluid.

17. The method of claim 12, wherein the chelator comprises EDTA, the polyvalent cation reactive polymer comprises alginate, the polyvalent cation source comprises calcium carbonate, the treatment fluid further comprises a formic acid ester and/or lactic acid ester.

18. The method of claim 12, wherein the polyvalent cation comprises a polyvalent metal cation.

* * * * *